United States Patent
Gueguen

(10) Patent No.: US 6,874,571 B2
(45) Date of Patent: Apr. 5, 2005

(54) SPIRAL HEAT EXCHANGERS

(75) Inventor: Jean-Marie Gueguen, Argenteuil (FR)

(73) Assignee: Spirec (Societe Anonyme), Argenteuil (FR)

( * ) Notice: Subject to any disclaimer, the term of this patent is extended or adjusted under 35 U.S.C. 154(b) by 0 days.

(21) Appl. No.: 10/275,006

(22) PCT Filed: May 25, 2001

(86) PCT No.: PCT/FR01/01619
§ 371 (c)(1),
(2), (4) Date: Oct. 31, 2002

(87) PCT Pub. No.: WO01/92805
PCT Pub. Date: Dec. 6, 2001

(65) Prior Publication Data
US 2003/0102114 A1 Jun. 5, 2003

(30) Foreign Application Priority Data
May 26, 2000 (FR) .............................. 00 06779

(51) Int. Cl.⁷ ................................................ F28D 1/03
(52) U.S. Cl. ...................................... 165/164; 165/177
(58) Field of Search .............................. 165/164, 165, 165/177

(56) References Cited

U.S. PATENT DOCUMENTS

| | | | |
|---|---|---|---|
| 1,790,036 A | * 1/1931 | Wiltse | 210/168 |
| 2,017,201 A | 10/1935 | Bossart | |
| 2,129,300 A | 9/1938 | Bichowsky | |
| 2,657,018 A | * 10/1953 | Simpelaar | 165/103 |
| 3,007,680 A | * 11/1961 | Harris | 165/150 |
| 4,274,186 A | 6/1981 | Pringle | |
| 5,445,216 A | * 8/1995 | Cannata | 165/88 |
| 5,505,255 A | * 4/1996 | Viessmann | 165/164 |

FOREIGN PATENT DOCUMENTS

| | | |
|---|---|---|
| DE | 3031698 | 3/1982 |
| FR | 489 717 | 3/1919 |
| FR | 2 096 719 | 2/1972 |
| JP | 55-123993 | 9/1980 |

* cited by examiner

*Primary Examiner*—Allen Flanigan
(74) *Attorney, Agent, or Firm*—Young & Thompson

(57) ABSTRACT

The invention concerns a spiral heat exchanger, consisting of a series of spiral plates spaced apart from one another by spacer elements (3), wherein the spiral plates are formed by a coiled flattened tubular element and consisting of at least a sheet of material (1) whereof the edges (1a, 2b) are sealingly assembled by linking elements (4) which extend parallel to the longitudinal axis (yy') of the sheet (1). The exchanger is characterized in that the flattened tubular element comprises on its outer surfaces ribs (3) inclined relative to its transverse axis (xx').

10 Claims, 2 Drawing Sheets

SPIRAL HEAT EXCHANGERS

CROSS REFERENCE TO RELATED APPLICATION

This is the 35 USC 371 national stage of international application PCT/FR01/01619 filed on May 25, 2001, which designated the United States of America.

FIELD OF THE INVENTION

The present invention relates to exchangers, and in particular exchangers intended to ensure a heat exchange between two fluids having to be separated from each other, such as spiral exchangers of the type made by coiling metal plates.

BACKGROUND OF THE INVENTION

Exchangers of this type, which are constituted from a sheet of bent plate which is coiled on itself about the bend are known. In the course of the phase of coiling, spacer elements are arranged between the different spiral plates of the exchanger, intended to space the plates apart from one another so as to allow a flow of fluid between these various spiral plates. The end of the exchanger as well as the edges of the sheets forming the spiral plates must consequently be obturated, this usually being effected by welding beads. Such an exchanger is thus constituted by two independent circuits in which fluids, and in particular liquids, can circulate, namely, on the one hand, the space included between the various spiral plates and, on the other hand, the space included between the two bent walls of each spiral plate.

Although such an exchanger is quite satisfactory as far as its functioning is concerned, it presents drawbacks regarding its mode of manufacture and, more specifically regarding the production of the two welding beads intended to join the edges of the two sheets of plate forming the spiral plates. In effect, the shape of these welding beads is particularly complex as they must follow the spiral shape of the plates. This welding operation therefore constitutes a difficult operation which must thus be carried out by manual means.

SUMMARY OF THE INVENTION

The present invention has for its object to overcome this drawback by proposing a novel type of spiral metallic exchanger which is also obtained by coiling plate but which presents the advantage of being able to be produced by automatized means, insofar as the necessary operations are simple to carry out.

The present invention thus has for its object an exchanger of spiral type, constituted by a series of spiral plates spaced apart from one another by spacer elements, in which the spiral plates are formed by a coiled flattened tubular element and consisting of at least one sheet of material of which the edges are sealingly assembled by linking means which extend parallel to the longitudinal axis of the sheet, characterized in that the flattened tubular element comprises on its outer surfaces ribs inclined relative to its transverse axis.

The present invention is particularly interesting in that it enables two welding beads which, according to the prior state of the art, were spiral in shape, to be replaced by one or more perfectly rectilinear welding beads, this making it possible to simplify the operation of manufacture in particularly consequent manner, making it possible in particular to carry out the latter by automatized means.

The tubular element may be formed from a sheet of metal which is bent along its longitudinal axis so that its edges are joined by holding and sealing means. The holding and sealing means may preferably be disposed along the central longitudinal axis of the metallic sheet.

In another form of embodiment of the invention, the tubular element will be formed from two superposed sheets of metal which will be joined by their lateral edges by holding and sealing means.

These latter will, most of the time, be constituted by a welding bead.

The flattened tubular element will comprise, on its outer faces, ribs inclined with respect to its transverse axis. These ribs will be formed on the sheet of metal constituting the tubular element by a process of deformation thereof and in particular by a stamping process.

In a form of embodiment of the invention making it possible to double the distance covered by a fluid circuit, the edges of the sheet forming the flattened tubular element are joined to the opposite wall of the tubular element, over a part of the length thereof.

It will be noted that, according to the invention, the fact of giving the ribs an inclination with respect to the transverse axis of the tubular element, makes it possible to be certain that, during coiling, certain of the various spiral plates do not come into contact with one another. In effect, such inclination makes it possible, for two spiral plates in contact, for the inclination to be opposed, so that one is sure of the spacing actually obtained. In this way, a considerable regularity of the section of passage offered to the fluid is obtained, which section of passage may be strictly controlled during manufacture, by playing, of course, on the height of the ribs.

The inclination of the ribs also has the effect of improving the rigidity of the structure of the exchanger once the latter is coiled.

Finally, from the standpoint of functioning of the exchanger, the inclination of the ribs also has a beneficial effect, in that it makes it possible to increase the effects of turbulences in the course of flow, so that the contact of the fluid against the wall is thus improved. The heat exchange is thus very clearly improved.

Furthermore, it is known that, for certain particular applications, it proves advantageous to be able to control the effective section of passage which exists in the two circuits conveying the respective fluxes of the exchanger. The present invention is particularly interesting in that it makes it possible to produce two circuits of which the sections of passage are at the same time perfectly controlled and different.

The present invention also has for its object a process for manufacturing an exchanger of spiral type constituted by coiling at least one sheet, in which a flattened tubular element is constituted from at least one sheet, of which the edges are sealingly joined by linking means which extend parallel to the longitudinal axis of the sheet, and this tubular element is coiled on itself in order to form a series of spiral plates, characterized in that it comprises a step in the course of which spacer elements are made on the spiral plates.

BRIEF DESCRIPTION OF THE DRAWINGS

Various forms of embodiment of the present invention will be described hereinafter, by way of non-limiting examples, with reference to the accompanying drawing in which.

DETAILED DESCRIPTION OF THE INVENTION

Figure 1:
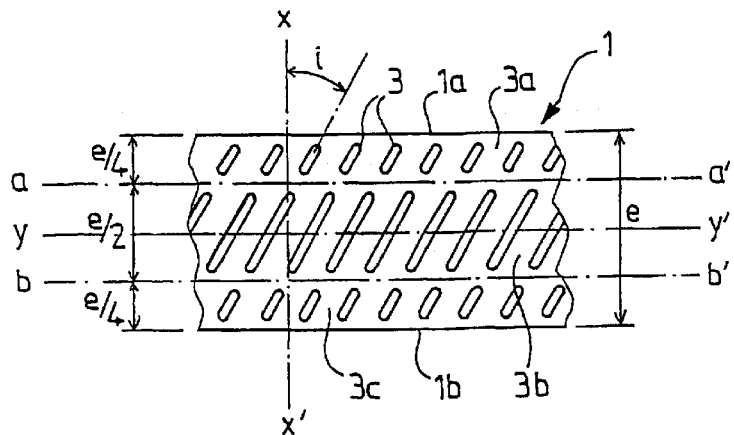
FIG. 1 is a partial plan view of a sheet of metal intended to constitute an exchanger according to the invention, which is represented before the bending prior to its coiling.

The spiral metallic exchanger according to the invention is constituted from a metallic sheet 1, particularly of stainless steel, which is offered to the user in the form of a roll 2. Ribs 3 are made on the sheet 1, which are obtained by stamping. These ribs 3 form a certain angle of incidence i with the transverse axis xx' of the sheet 1 which, in the present embodiment, is of the order of 45°. The ribs 3 are distributed over three transverse zones, namely a first lateral zone 3a of length substantially equal to a quarter of the width e of the sheet 1, a central zone 3b of length substantially equal to half the latter, and finally a third lateral zone 3c of length substantially equal to a quarter of the latter. The height h of these ribs 3 is equal to half the space which it is desired to provide between the spiral plates once the coiling operation is finished. In effect, the inclination i of the ribs with respect to the transverse axis xx' of the sheet 1 makes it possible that, during coiling, the ribs 3 of the inner face of one spiral plate come into abutment on the ribs 3 of the outer face of the preceding spiral plate, since these respective ribs intersect during coiling. This form of embodiment is interesting in that it makes it possible to obtain, during bending, a superposition of the heights h of the ribs made respectively on the base fold 1' and on the folds 1", without it being necessary to that end to calculate and define a specific spacing along the longitudinal axis yy' of the sheet of plate 1.

Figure 2:
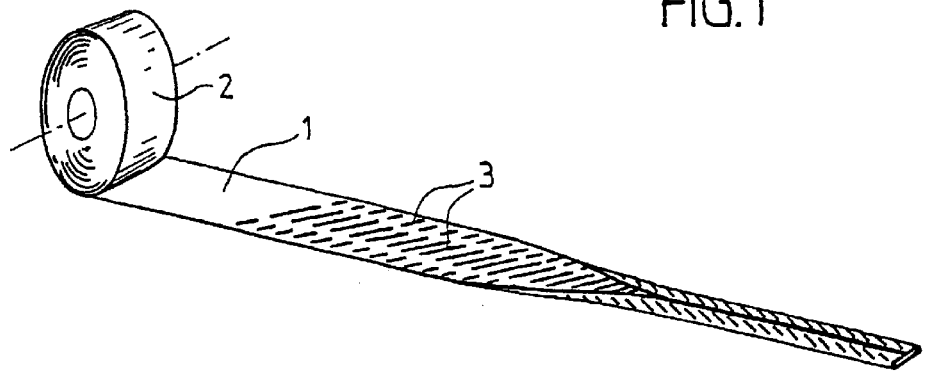
FIG. 2 is a schematic view in perspective showing the various phases of bending to be made on a band of metal, prior to the coiling operation.
Figure 3:
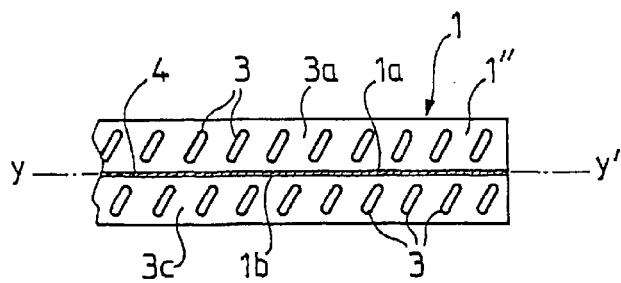
FIG. 3 is a partial plan view of the sheet of metal shown in FIG. 1 after the bending operation.
Figure 4:
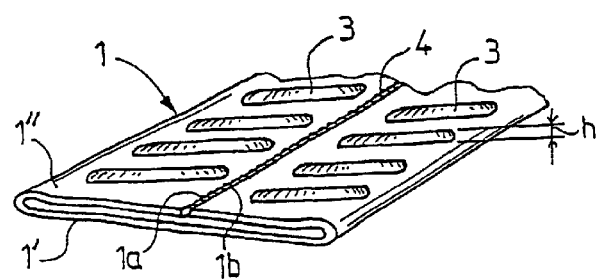
FIG. 4 is a partial view in perspective of the bent sheet shown in FIG. 3.

As is shown in schematic FIGS. 1 and 2, the sheet 1 is bent along two respective longitudinal axes aa' and bb' which are respectively disposed at a distance e/4 from the lateral edges 1a and 1b of the sheet 1. After bending, as shown in FIGS. 3 and 4, the respective lateral edges 1a and 1b are opposite each other and disposed along the longitudinal and central axis yy' of the sheet 1. After such bending, the sheet 1 thus forms three folds, as shown in FIG. 4, namely a base fold 1' and two upper folds 1". The upper folds 1" are spaced apart from the base fold 1' so as to create, between the inner faces of these folds, a passage in which one of the fluids of the exchanger will be admitted. The lateral edges 1a and 1b of the two upper folds are then joined by a rectilinear welding bead 4, this constituting an operation easy to carry out by automatized, even simplified means.

The bent plate is then coiled on itself in a direction such that the welding bead 4 lies inside the coil. Once the latter is effected, an element is available which, after various operations of adaptation, is capable of constituting the exchanger.

Figure 5:
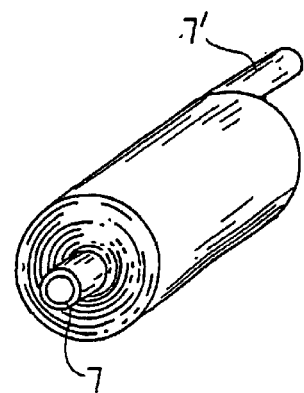
FIG. 5 is a view in perspective of an assembly constituted by the metallic sheet bent then coiled and by two inlet/outlet admissions of the exchanger according to the invention.

These operations consist, in known manner in this type of product, in creating an inlet and an outlet for each of the two independent circuits. In this way, the first circuit, which is constituted by the space existing between the folds 1' and 1" forming each spiral plate, is provided, as shown in FIG. 5, with a first inlet/outlet which is constituted by a tube 7 connected to the centre of the exchanger and with a second inlet/outlet consituted by a tube 7' which is connected to the periphery thereof. As for the second circuit, it is constituted by the spaces included between the different spiral plates.

Figure 6:
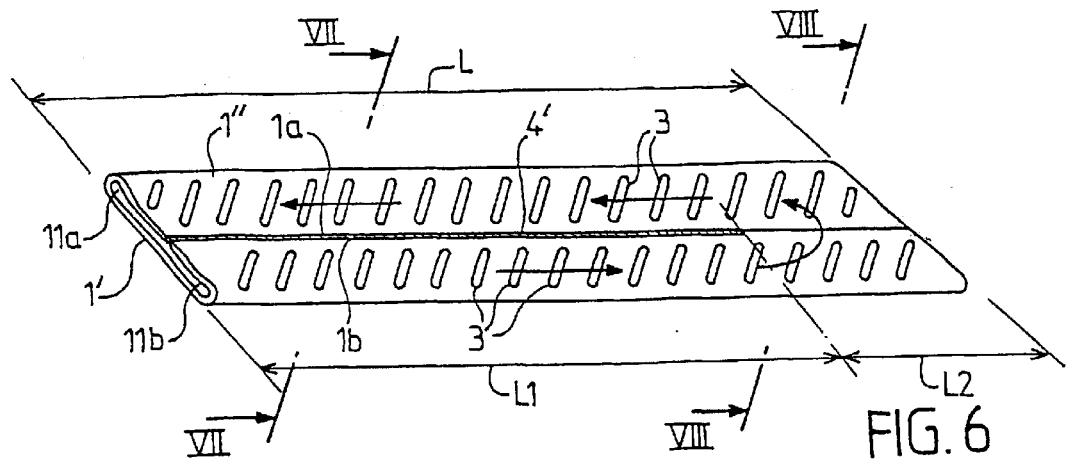
FIG. 6 is a view in perspective of a variant embodiment of a sheet of metal intended to constitute an exchanger according to the invention after the operation of bending and welding.
Figure 7:
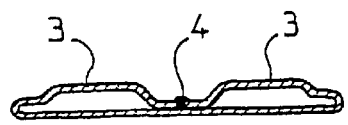
FIG. 7 is a view in transverse section of the bent sheet of metal shown in FIG. 6 along axis VII—VII thereof.
Figure 8:
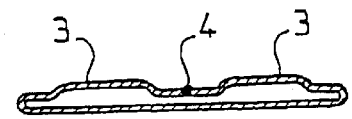
FIG. 8 is a view in transverse section of the bent sheet of metal shown in FIG. 6, along axis VIII—VIII thereof.

In a variant embodiment of the present invention, the distance covered by the fluid in the first circuit, i.e. in the one included between the folds 1' and 1", may be doubled. Reference will for example be made to FIGS. 6 to 8 which schematically show a sheet of plate intended to constitute an exchanger, after bending and before coiling. According to this variant, the two ends 1a and 1b of the folds 1" above the lower fold 1' are joined over the greater part L1 of the length L of the bent plate, so as to constitute two channels which are in parallel. Over the remaining length L2, the edges 1a and 1b will only be joined together so as to constitute a passage between the two channels. Under these conditions, concerning this second circuit, the admission of the fluid will be effected via one of its two inlet/outlet faces 11a and the outlet thereof will be effected via the other inlet/outlet 11b. Such an arrangement makes it possible to double the distance covered by the fluid in this circuit, which improves the heat exchange. Furthermore, this also makes it possible to effect an admission and an exit of the fluid from the centre of the exchanger, the tube 7' in that case being, in this form of embodiment, coaxial to the inlet/outlet 7.

In a variant of this form of embodiment of the invention, the weld of the two lateral faces 1a and 1b on the base fold 1' may be replaced by an elastic joint which will be disposed between the two lateral edges 1a and 1b over the length L1 mentioned hereinabove.

The present invention is particularly interesting in that it has been observed that the ribs 3 which are intended to effect a determined given spaced apart relationship between the different spiral plates of the exchanger, allow, by reason of the possibility of deformation that they make it possible to attain in the longitudinal direction, the two folds of the lower and upper plates to be deformed with respect to each other as required by the increase of radius of curvature of these two respective folds which is manifested during coiling.

Figure 9:
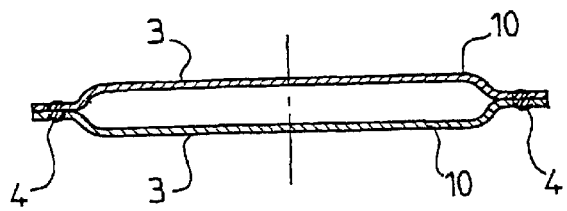
FIG. 9 is a view in cross section of a variant embodiment of the invention representing two sheets of metal assembled before the coiling operation.

In another form of embodiment of the invention, which is shown in FIG. 9, use is not made of a bent sheet of plate but of two distinct sheets 10 which, after formation of the ribs 3, are assembled by means in particular of a welding bead 4 which is disposed longitudinally along each of the transverse edges (1a, 1b).

This element may, of course, also be obtained from a tubular element which will be deformed.

The present invention, as mentioned previously, makes it possible to produce two circuits for circulation of fluids of which the cross sections for passage are different from each other, this being advantageous within the framework of certain applications of the exchanger.

Figure 10:
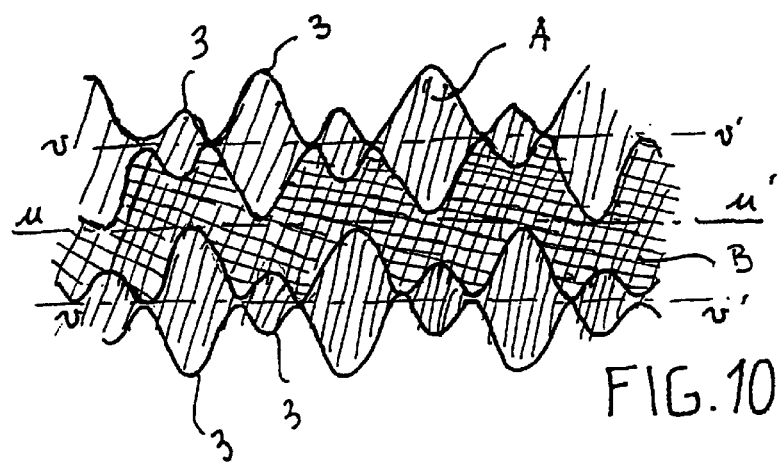
FIG. 10 is a schematic view of a variant embodiment of an exchanger according to the invention.

FIG. 10 very schematically shows such a form of embodiment of the invention. A (simple hatchings) and B (crossed hatchings) respectively denote therein the two fluid circuits of the exchanger.

Line uu' represents the plane of contact of the apices of two successive spiral plates and vv' the plane of contact of the two welded elements forming a spiral plate. FIG. 10 shows the assembly of the elements before the operation of coiling.

According to this form of embodiment, the height of two successive ribs $h_{B1}$ and $h_{B2}$ is different. As a result, as shown in FIG. 10, the section of passage of the circuit B is greater than that of the circuit A. By playing on the difference in heights $h_{B1}$ and $h_{B2}$ of the ribs 3, it will thus be possible to control this difference in section of passage, and therefore of loss of pressure, offered to the respective fluids by the two circuits.

Although the different forms of embodiment of the invention described hereinbefore employ metallic sheets, it is also possible, for certain types of application, to use sheets made of other materials and in particular sheets made of synthetic material.

What is claimed is:

1. Spiral heat exchanger comprising:
   a series of spiral plates spaced apart from one another by spacer elements;
   said spiral plates being formed by a coiled flattened tubular element consisting of one sheet of material having a longitudinal axis, a transverse axis, and longitudinal edges;
   said longitudinal edges being sealingly assembled by linking means which extend parallel to the longitudinal axis;
   said flattened tubular element comprising on its outer surface ribs which are inclined relative to the transverse axis; and
   said assembled longitudinal edges being joined to an opposite internal wall of the flattened tubular element over a greater part of the length thereof, thereby defining two substantially parallel channels and a passage between the two channels over the remaining length.

2. The spiral heat exchanger according to claim 1, wherein the linking means are disposed along the central longitudinal axis of the sheet.

3. The spiral heat exchanger according to claim 1, wherein the linking means comprise a welding bead.

4. The spiral heat exchanger according to claim 1, wherein the ribs are formed on the sheet, constituting the tubular element by a stamping process.

5. The spiral heat exchanger according to claim 1, wherein the sheet is made of metal.

6. Process for manufacturing a spiral heat exchanger, which comprises:
   providing one sheet of material having a longitudinal axis, a transverse axis, and longitudinal edges;
   forming a flattened tubular element from said sheet by sealingly assembling the longitudinal edges with linking means which extend parallel to the longitudinal axis of the sheet;
   coiling said flattened tubular element on itself so as to form a series of spiral plates;
   making spacer elements on the spiral plates; and
   joining the assembled longitudinal edges to an opposite internal wall of the flattened tubular element over a greater part of the length thereof, thereby defining two substantially parallel channels and a passage between the two channels over the remaining length.

7. The process according to claim 6, wherein the linking means are disposed along the central longitudinal axis of the sheet.

8. The process according to claim 6, wherein the linking means comprise a welding bead.

9. The process according to claim 6, wherein the spacer elements are made by stamping the sheet before the latter is coiled.

10. The process according to claim 6, wherein the sheet is made of metal.

* * * * *